United States Patent
Chandrashekhar et al.

(10) Patent No.: US 8,256,002 B2
(45) Date of Patent: Aug. 28, 2012

(54) TOOL, METHOD AND APPARATUS FOR ASSESSING NETWORK SECURITY

(75) Inventors: Uma Chandrashekhar, Morganville, NJ (US); Eunyoung Kim, Eatontown, NJ (US); Daniel P. Koller, Succasunna, NJ (US); Andrew Roy McGee, Toms River, NJ (US); David D. Picklesimer, West Caldwell, NJ (US); Timothy J. Politowicz, Newton, NJ (US); Steven H. Richman, Marlboro, NJ (US); James S. Tiller, St. Petersburg, FL (US); Chen Xie, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 2317 days.

(21) Appl. No.: 10/348,742

(22) Filed: Jan. 21, 2003

(65) Prior Publication Data
US 2003/0212909 A1 Nov. 13, 2003

Related U.S. Application Data

(60) Provisional application No. 60/349,947, filed on Jan. 18, 2002.

(51) Int. Cl.
*H04L 29/06* (2006.01)
(52) U.S. Cl. ........................................... 726/25
(58) Field of Classification Search ............... 726/23, 726/25, 1, 22; 705/4, 10, 35; 709/223, 224
See application file for complete search history.

(56) References Cited

U.S. PATENT DOCUMENTS

| | | | |
|---|---|---|---|
| 6,374,358 B1 * | 4/2002 | Townsend | 726/1 |
| 6,925,443 B1 * | 8/2005 | Baggett et al. | 705/10 |
| 2003/0126049 A1 * | 7/2003 | Nagan et al. | 705/35 |

* cited by examiner

*Primary Examiner* — Gilberto Barron, Jr.
*Assistant Examiner* — Abdulhakim Nobahar
(74) *Attorney, Agent, or Firm* — Wall & Tong, LLP

(57) ABSTRACT

Tools and methods in which user interaction via a common user interface enables the assessing of network security prior to implementation of the network, as well as assessing the security of existing networks, portions of existing networks, or modifications to existing networks. A network security model useful in realizing the tools and methods is also disclosed.

21 Claims, 10 Drawing Sheets

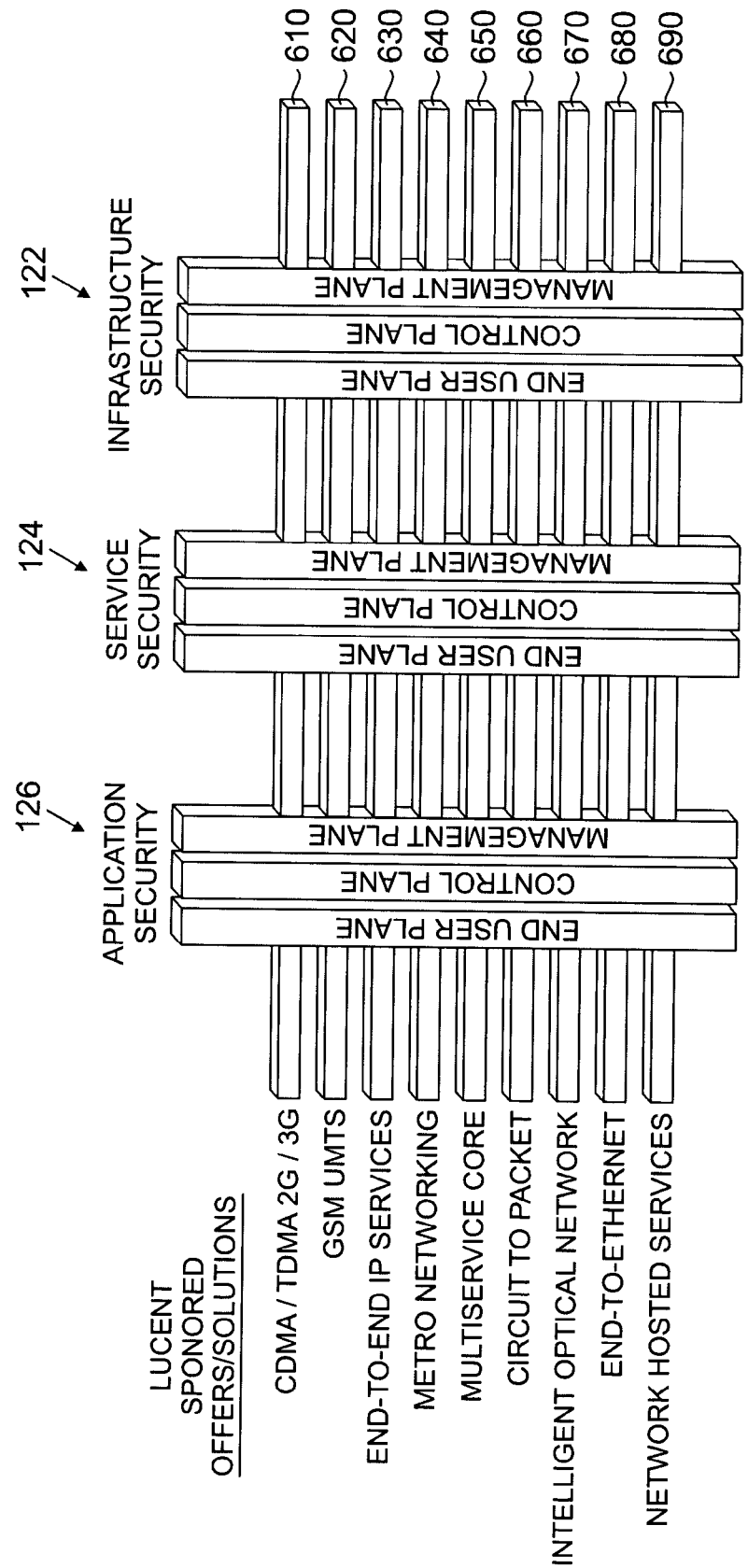

TOOL, METHOD AND APPARATUS FOR ASSESSING NETWORK SECURITY

CROSS REFERENCE TO RELATED APPLICATIONS

This application claims the benefit of commonly owned provisional patent application Ser. No. 60/349,947, filed Jan. 18, 2002, which is hereby incorporated by reference in its entirety.

TECHNICAL FIELD

The invention relates generally to communications systems and, more specifically, to tools, methods and apparatus for assessing network security.

BACKGROUND OF THE INVENTION

There is at present no systematic way to analyze the security capabilities of a given network architecture, either for an existing network, a network being modified, or a network being deployed. That is, a security analysis of a network is primarily performed after the network has been deployed. First, the network is deployed with the network equipment's configuration based on some estimation of what type of security threats are present and how to defend against them. Then a suite of security probes is run against the network to identify security vulnerabilities. Typically, each probe only identifies one type of security vulnerability in one network element at a time. Once the probe has identified a particular security vulnerability, the network element is reconfigured to address that vulnerability and the network probing continues. Unfortunately, in addition to the inefficiencies of deploying a network in this manner, at any given point in time the level of network security depends on which security probes have been run and whether the network administrators have reconfigured the network to address the results of these security probes.

Because there is no standard methodology or security assessment tool, and no network security framework on which to base security assessments, the results of today's security assessments are heavily dependent on the skill level of the personnel performing the assessment. The individual performing the security assessment also determines the questions to be asked during the security interview process, as well as decides which tests should be performed and how they should be performed. The individual performing the security assessment also keeps track of the information and data that is gathered during the assessment and correlates this information and data to identify actual security vulnerabilities (filtering out the false-positives). Finally, once the security vulnerabilities have been identified, the individual must track down recommendations to address these vulnerabilities from publicly accessible sources, (or develop recommendations if none exist) and manually put together a report for a final read-out to their customer. Because of the complex nature of all of these tasks, most individuals take a "cookie-cutter" approach to performing security assessments in that they ask the same questions, run the same tests, etc. for every type of customer in a "one-size fits all" manner. Thus, there are quality control issues and inefficiencies inherent in the current practice.

SUMMARY OF THE INVENTION

These and other deficiencies of the prior art are addressed by the present invention of tools and methods in which user interaction via a common user interface enables the assessing of network security prior to implementation of the network as well as assessing the security of existing networks, portions of existing networks, or modifications to existing networks throughout the network lifecycle (planning, design, deployment, maintenance). A network security model useful in realizing the tools and methods is also disclosed A software tool for assessing network security according to one embodiment of the invention comprises: a first module, for receiving network characterization information from a customer; a second module, for determining if the network characterization information has associated with it a network security vulnerability; and a third module, for generating security recommendations based upon any determined network security vulnerabilities.

BRIEF DESCRIPTION OF THE DRAWINGS

The teachings of the present invention can be readily understood by considering the following detailed description in conjunction with the accompanying drawings, in which:

FIG. 6 depicts a graphical representation of the security model as applied to a plurality of product and service offerings.

To facilitate understanding, identical reference numerals have been used, where possible, to designate identical elements that are common to the figures.

DETAILED DESCRIPTION OF THE INVENTION

The subject invention will be primarily described within the context of a network security model and tools, methods and apparatus for assessing network security prior to implementation of a circuit switched network or packet switched network. However, it will be appreciated by those skilled in the art that the present invention is also applicable to assessing existing networks and proposed modifications to existing networks. Moreover, the security model and related tools, methods and apparatus are extremely useful to equipment manufacturers and application developers seeking to ensure that their products and services are developed with a view towards the overall network security instead of their current individual product-oriented focus. While various functions and/or modules will be described herein, it will be appreciated that the term "module" is to be broadly interpreted to represent a function or group of functions which may be implemented in software and which may represent a model, portions of a model, a tool, portions of a tool and, more generally, any single or combine functionality such as discussed herein.

Figure 1:
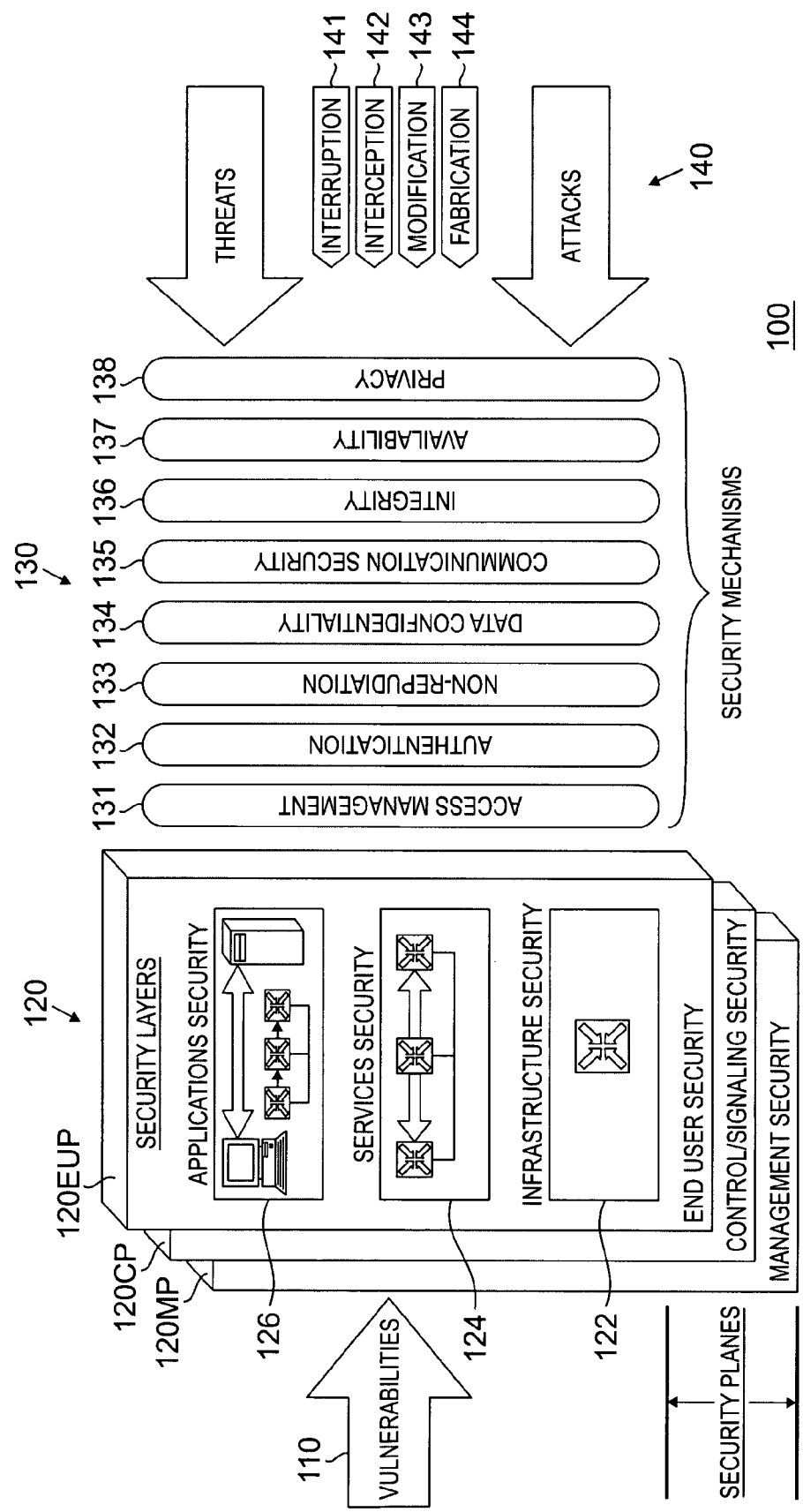
FIG. 1 depicts a high-level block diagram of a network security model according to an embodiment of the invention.

FIG. 1 depicts a high-level block diagram of a network security model according to an embodiment of the invention.

Specifically, the model 100 of FIG. 1 identifies, illustratively, eight classes of countermeasures to security threats which are denoted herein as Security Mechanisms 130. Three Security Layers denoted as Infrastructure Security Layer 122, Services Security Layer 124 and Applications Security Layer 126 identify where within the control topology of a network the protection provided by the Security Mechanisms 130 is implemented. Each of the three Security Layers has associated with it each of three Security Planes, which planes indicate the type of activities that must be protected at the individual Security Layer. Specifically, each of an End-User Security Plane 120EUP, a Control Security Plane 120CP and a Management Security Plane 120MP comprise respective Infrastructure Security layers 122, Services Security Layers 124 and Applications Security Layers 126.

The security mechanisms 130 comprise security countermeasures adapted to identify network vulnerabilities and thwart attempts to exploit network vulnerabilities. These mechanisms are not limited to only maintaining network security, but also extend to protect applications and end-users. In addition, they provide assistance to service providers offering security services to their respective customers. The security mechanisms 130 comprise an Access Management mechanism 131, an Authentication mechanism 132, a Non-repudiation mechanism 133, a Data Confidentiality mechanism 134, a Communication Security mechanism 135, an Integrity mechanism 136 an Availability mechanism 137 and a Privacy mechanism 138.

The Access Management mechanism 131 ensures that only authorized personnel or devices are allowed access to network elements, stored information, information flows, services and applications. In addition, strong accountability provides a means to correlate actions to individuals or devices. Finally, different access levels guarantee that individuals and devices can only gain access to network elements, stored information, and information flows that they are authorized for.

The Authentication mechanism 132 is used to confirm the identities of communicating entities. Authentication ensures the validity of the claimed identities of the entities participating in communication (e.g. person, device, service, or application) and provides assurance that an entity is not attempting a masquerade or unauthorized replay of a previous communication.

The Non-repudiation mechanism 133 provides proof of the origin of data, or the cause of, an event or an action. Non-repudiation ensures the availability of evidence that can be used to prove that some kind of event or action has taken place, so that the cause of the event or action cannot be repudiated later.

The Data Confidentiality mechanism 134 ensures that data is kept private from unauthorized access or viewing using, for example, encryption or other data security techniques.

The Communication Security mechanism 135 ensures that information flows only between authorized end points such that the information flow is not diverted or intercepted as it flows between these end points.

The Integrity mechanism 136 ensures the correctness of data such that the data is protected against unauthorized modification, deletion, creation, and replication.

The Availability mechanism 137 ensures that there is no denial of authorized access to network elements, stored information, information flows, services and applications. This mechanism optionally implements appropriate disaster recovery solutions.

The Privacy mechanism 138 ensures that confidential information is not accessible by unauthorized personnel or devices, such as account information stored by the service provider, or usage/location information pertaining to the end-user.

The above-described mechanisms 130 are applied to a hierarchy of network equipment and facility groupings denoted as the Security Layers 120. The Security Layers 120 identify where security must be designed into products and solutions. The Security Layers 120 comprise the Infrastructure Security Layer 122, Services Security Layer 124 and Applications Security Layer 126.

The Infrastructure Security Layer 122 represents the network transmission facilities as well as individual network elements. Network architects and designers must ensure that the network elements and transmission facilities address the security mechanisms described in the previous section. Otherwise, the network will be vulnerable to security threats. With this requirement in mind, network equipment manufacturers develop individual network elements that preferably include security awareness to keep buffer overflows, operating system flaws, power failures and the like from opening security holes. The eight mechanisms of security countermeasures are preferably designed into products right from the start so that fewer security vulnerabilities are designed in. Otherwise, there is the risk of developing products that contain security holes, making securing the network more difficult and expensive.

The Services Security Layer 124 is adapted to providing network services to customers in a secure manner. Network Services are provided by Service Providers and include Virtual Private Networks (VPNs), Quality of Service (QoS), Location Services, and the like. There are two main potential targets of security threats: Service Providers and their customers. Therefore, in order to protect themselves and their customers, Service Providers preferably apply each of the security countermeasures to the services, and their requisite security planes, that they provide.

The Applications Security Layer 122 is adapted to providing network-based applications to customers in a secure manner. These applications are enabled by network services and include E/M-Commerce, Network-Based Training, Video Collaboration, etc. Network-based applications may be provided by third-party Application Service Providers (ASPs) or by Service Providers acting as ASPs. There are at least three potential targets for security attacks; namely, the ASP customer, the ASP and the Service Provider. Therefore, preferably, Service Providers and ASPs enter into a partnership that defines their respective security responsibilities to ensure that the eight security countermeasure mechanisms are all in place on a per-application basis.

Table 1 provides some examples of how the Security Mechanisms are applied to the Security Layers. Examples can be identified for all three security planes: end-user, control, and management.

TABLE 1

| Security Mechanism | Security Layer | | |
|---|---|---|---|
| | Infrastructure | Services | Applications |
| Access Management | Controls access to individual network elements or transmission facilities. | Controls access to network services. | Controls access to network-based applications. |
| Authentication | Confirms identify of person attempting to access individual network elements or transmission facilities. | Confirms identify of person attempting to access network services. | Confirms identify of person attempting to access network applications. |
| Non-repudiation | Maintains a record of activities performed by each person who has accessed individual network elements or transmission facilities. | Maintains a record of activities performed by each person who has accessed network services. | Maintains a record of activities performed by each person who has accessed network applications. |
| Data Confidentiality | Protection against the unauthorized reading of data stored on individual boxes. | Protection against the unauthorized reading of data as it traverses the network. | Protection against the unauthorized reading of data as it is being processed or generated by an application. |
| Communication Security | Protection against the incorrect installation of cables. | Data is not diverted or intercepted as it traverses the network. | Data is only transmitted between authorized applications and endpoints. |
| Integrity | Protection against unauthorized creation, modification, deletion of data stored on individual network elements. | Protection against unauthorized creation, modification, deletion of data as it traverses the network. | Protection against unauthorized creation, modification, deletion of data by applications. |
| Availability | Individual network element is available. | Network Service is available. | Application is available. |
| Privacy | Information about individual network elements (e.g., IP addresses) is kept private. | Information about services being used by end-users is kept private. | Information about applications being accessed by end-users is kept private. |

Three types of activities are performed over the Infrastructure, Services and Applications security layers. These activities are represented by three planes; namely the Management Plane 120MP, the Control Plane 120CP, and the End-user Plane 120EUP. The protection provided by the eight mechanisms of security countermeasures is provided to each of these types of activities. The management plane 120MP is adapted to operations, administration, maintenance, provisioning and other management functions associated with the network elements, transmission facilities, operations support systems and the like.

The control plane 120CP is adapted to enabling the efficient delivery of information, services and applications across the network. This type of traffic may include routing protocols, DNS, SIP, SS7 and other similar types of traffic.

The end-user plane 120 EUP is adapted to addressing service provider customer access and use of a service provider's network. This plane also represents actual end-user data flows and traffic. End-users may use the network to only provide connectivity and transport, or to provide access to network-based applications.

Within the context of the network security model 100 of FIG. 1, the three security layers (infrastructure 122, services 124 and applications 126) within each plane (management 120MP, control 120CP and end-user 120EUP) are preferably designed in a manner that provides isolation from corresponding security layers in other planes. In this manner, attacks or problems associated with a security layer in one plane do not propagate to a corresponding layer in another plane. For example, in the case of a denial of service attack a flood of DNS lookups on the end-user plane caused by end-user requests cannot deny service to others or otherwise lock Out the operations, administration, maintenance and provisioning (OAM&P) interface of the management plane, which interface is used by an administrator to correct such a problem.

The eight mechanisms in the model address at least four types of security threats and/or attacks 140 to a computer system or network; namely, Interruption 141, Interception 142, Modification 143, and Fabrication 144. These threats can occur on the Management Plane, Control Plane or End-User Plane.

Interruption 144 occurs when an asset of the system becomes lost, unavailable, or unusable. This is an attack on availability. Examples include malicious destruction of a network element, erasure of a software program or data file, cutting of a communication line, or malfunction of an operating system file manager so that it cannot find a particular disk file. The availability mechanism in the model addresses this type of threat.

Interception 142 occurs when an unauthorized party gains access to an asset. The outside party can be a person, a program, or a computing system. This is an attack on confidentiality. An example of this type of attack is wiretapping to obtain data in a network, or passive listening of the wireless radio transmission. The access management, data confidentiality, communication security, and privacy mechanisms in the model address this type of threat.

Modification 143 occurs when an unauthorized party tampers with an asset. This is an attack on integrity Examples include changing the network configuration values in a database, or modifying data being transmitted in a network. The integrity mechanism addresses the modification threat.

Fabrication 144 occurs when an unauthorized party gains access to and fabricates counterfeit objects on a computer system. This is an attack on authenticity. Examples include unauthorized access to the network, untraceable malicious activity to the network, the insertion of spurious messages in a network or the addition of records to the RADIUS database. The access management, authentication, non-repudiation, and integrity mechanisms in the model can prevent this threat.

Figure 8:
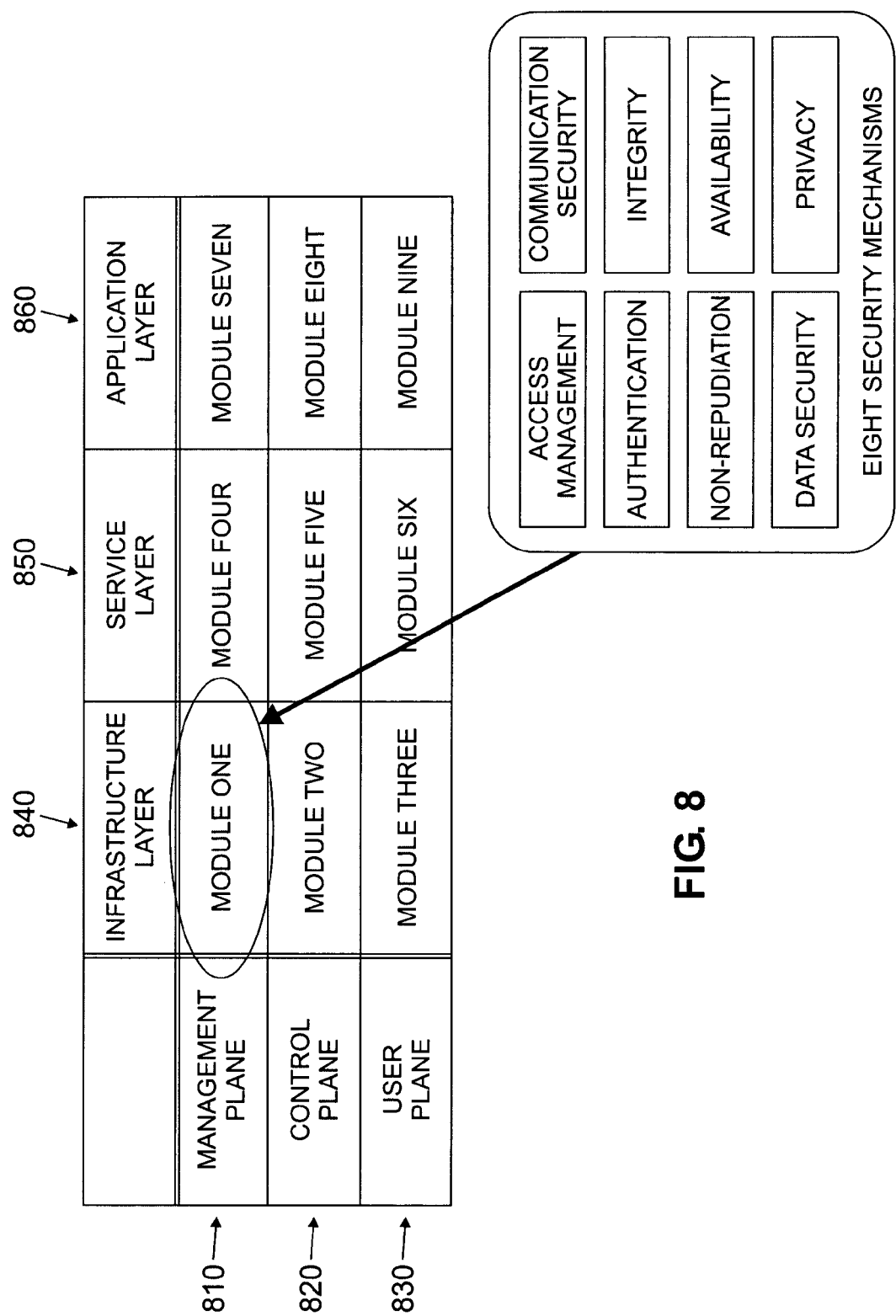
FIG. 8 depicts an representation of a network security model according to one embodiment of the invention.

Security Layer, Security Plane represents a unique perspective for application of the eight Security Mechanisms. Each of the nine perspectives has unique security issues that must be addressed, which result in unique security requirements for each perspective. In addition, FIG. 8 depicts how the network security model can be used to secure a specific aspect of a network. For example, to secure the management of a network, the functions comprising the top row of FIG. 9 are performed. Likewise to secure a specific network service, the functions comprising the middle column of FIG. 8 are performed.

The above-described network security model 100 addresses security concerns for the Management Information, Control/Signaling Information, and End-User Data used by and transported by the Network Infrastructure, Network Services, and Network-Based Applications. This network security model provides a comprehensive, top-down, end-to-end perspective on network security and can be applied to network elements, services, and applications in order to predict, detect, and correct security vulnerabilities. The network security model can be used over the entire lifetime of a network security program. It can be used to assist in the development of network security policies and requirements, as well as form the basis for a network security assessment. In addition, the network security model can be applied to all types of Service Provider and enterprise networks and across all layers of the protocol stack. Networks developed with attention to this network security model will have a comprehensive security architecture, enabling new value-added revenue generating security services such as Security Service Level Agreements (SLAs).

The above-described network security model 100 establishes a logical framework within which tools, methods and apparatus may be constrained to enable the design of secure networks, the assessment of existing networks to identify security vulnerabilities, the modification of existing networks to increase security and the design and/or integration into networks of compliant network elements and applications such that security concerns may be addressed by multiple vendors and administrators in a holistic manner.

Figure 2:
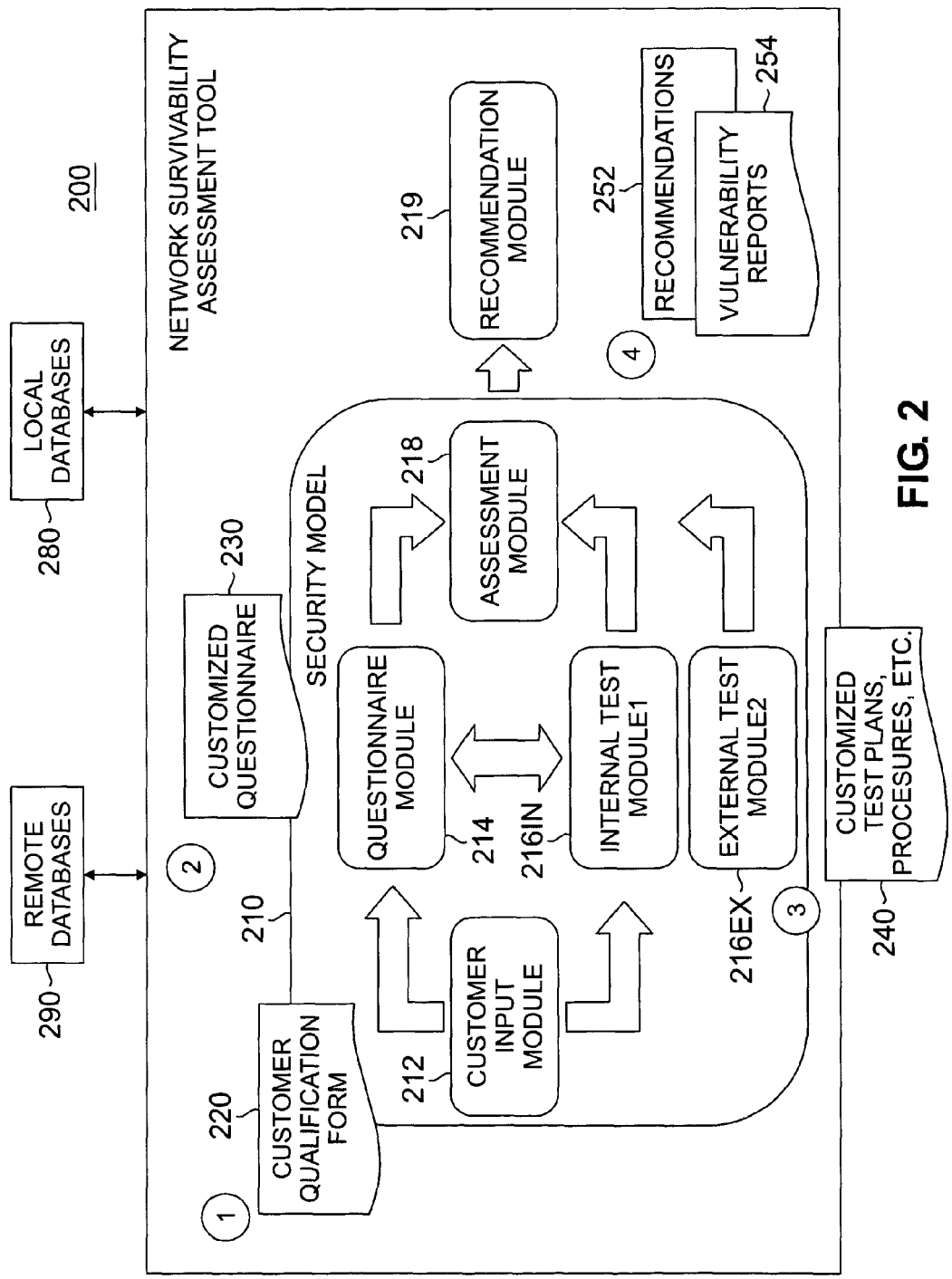
FIG. 2 depicts a high-level block diagram of a network survivability assessment service tool (NSAS) tool according to an embodiment of the invention.

FIG. 2 depicts a high level block diagram of a network survivability assessment service (NSAS) tool according to an embodiment of the invention. While primarily described within the context of the network security model discussed above with respect to FIG. 1, it will be appreciated by those skilled in the art that the NSAS tool and related methods discussed herein may be utilized with other security models. That is, the NSAS tool may implement the security model of FIG. 1, a modification of the security model of FIG. 1 or an entirely different security model. The NSAS tool 200 of FIG. 2 may be implemented as one or several computer-executable programs that provide the network security functions discussed herein. The NSAS tool 200 may also be implemented using a single computing device/work station or multiple computing devices/work stations in, for example, a client-server environment. The NSAS tool 200 preferably comprises a database-driven tool in which industry, government and/or proprietary vulnerability databases are accessed via, illustratively, a computer network. The NSAS tool is delivered to users via a single interface. A simplified representation of a suitable environment will be discussed below with respect to FIG. 3.

Specifically, the NSAS tool 200 comprises a customer input module 212, a questionnaire module 214, an internal test module 216IN, an external test module 216EX and an assessment module 218 all implemented in accordance with a network security model 210. The NSAS tool 200 utilizes the security model 210 to define and control the execution of the NSAS tool's 200 composite modules. In an illustrative embodiment of the invention, the aforementioned network security model is used by the NSAS tool to define and control the Customer Input module 212, Questionnaire module 214, Internal Test module 216IN, External Test module 216EX, Assessment module 218 and Recommendation module 219 such that the network security model's eight security mechanisms are addressed for the three security planes of each security layer. The NSAS tool 200 communicates as necessary with local NSAS databases 280 and publicly available (remote) databases 290. The local NSAS databases 280 may comprise a survey database 282, a questions database 284, a vulnerabilities database 286 and a tools database 288. The publicly available databases 290 may comprise a public vulnerabilities database, a remote tools database and the like.

The customer input module 212 generates a customer qualification form 220 based on discussions conducted with customer personnel responsible for defining the corporate security policy. The objective of these discussions is to define the scope of the security assessment, which is captured in the completed customer qualification form 220. The customer qualification form 220 is used to customize the remainder of the security assessment to the customer's unique security environment. The customer qualification form 220 is communicated to at least one of the questionnaire module 214, internal test module 216IN, and external test module 216EX. The questionnaire module 214 uses the customer qualification form 220 to automatically generate a customized questionnaire 230 for the customer's unique security environment that is administered to individuals responsible for implement the corporate security policy. The internal test module 216IN uses the customer qualification form 220 to automatically develop and configure an initial list of customized test plans, procedures, etc. 240, which are used to evaluate the actual security posture of the customer's network. This list of tests 240 is generated based on the customer's unique security requirements. The questionnaire module 214 and internal test module 216IN communicate results with each other in order to automatically refine the questionnaire 230 and test plans, procedures, etc. 240 as more information is gathered. Likewise, the external test module 216EX builds a list of customized test plans, procedures, etc. 240 based on information contained in the customer qualification form 220. The internal test module 216IN executes tests on the customer network from inside the customer's network and saves the results of these tests. The external test module 216EX executes tests on the customer network from outside the customer's network (e.g., using the Internet to deliver the tests) and saves the results of these tests. The questionnaire module 214, internal test module 216IN, and external test module 216EX communicate their results to the assessment module 218. The assessment module 218 processes the data supplied by the questionnaire module 214 and test modules 216 to identify security vulnerabilities which are communicated to a recommendation module 219. The recommendation module 219 provides recommendations 252 and/or vulnerability reports 254. The recommendations 252 and vulnerability reports 254 may be used to reduce network security problems within a proposed or actual network.

The customer qualification form 220 is used by the customer input module 220 to guide discussions conducted with customer personnel responsible for defining the corporate security policy. The objective of these discussions is to define the scope of the security assessment, which is captured in the completed customer qualification form 220. The customer qualification form 220 is used to customize the remainder of the security assessment to the customer's unique security environment. The customer qualification form 220, including customer responses to the survey questions contained therein, is provided to the questionnaire module 214 via the customer input module 212. The customer qualification form 220 enables the NSAS tool 200 to understand the type of network the customer has or proposes to have, the portion of a network being evaluated, the applications and/or services running on the network, the type of security breaches (if any) experienced by the customer and the customer's preferences and/or biases with respect to network security issues. The customer qualification form 220 may be adapted to include more or fewer qualification factors.

Upon receipt of the completed customer qualification form 220 (including customer responses to the survey questions), the questionnaire module 214 extracts questions from a question database based on the customer qualification information to form a customized questionnaire 230. The questionnaire module 214 then interacts with the customer/user to ask and receive answers to the questions within the generated customized questionnaire 230. Based on user responses to the customized questions (either individually, as subgroups or as a group), various testing tools and procedures may be selectively accessed and/or instantiated to verify that the network conforms to the user response. It should be noted that these testing tools and procedures may use other computer-based tools to perform network probing activities, network modeling activities, password strength assessments etc. as well as physical activities such as checking for locks, surveillance equipment, etc.

The testing tools are preferably invoked after all of the questions within the customized questionnaire 230 are answered. In this manner, those tools which might otherwise be invoked several times are only invoked once. The testing tools or test plans may be provided via the internal test module 216IN or external test module 216EX. The testing tools or resource locators adapted to finding and invoking the testing tools are stored in a tools database within the NSAS databases 280. The operation of the tools and/or test plans is optionally customized in response to user input provided by the customer input module 212 and the questionnaire module 214 to produce customized test plans and procedures 240. Upon conclusion of the test plans and/or procedures, the test results are provided to the assessment module 218.

The assessment module 218 utilizes the test data provided by the test modules 216 and customer information provided by the questionnaire module 214 to form raw assessment information. The raw assessment information is derived by using a vulnerability database to assess customer responses (provided via the customer qualification form 220 and/or customized questionnaire 230) as well as the results of any testing tools executed by the internal or external test modules 216. As discussed in more detail below, the vulnerabilities database provides in one embodiment a standardized nomenclature by which network vulnerabilities may be assessed. The raw assessment information is further processed by the recommendation module 219 to provide recommendations 252 and vulnerability reports 254. The recommendation module 219 also uses the vulnerability database to retrieve appropriate solutions to the identified vulnerabilities, which are provided as recommendations to the customer. The appropriate solutions may be provided by government bodies, standards organizations, network equipment or service providers and the like. Resource addresses for such solutions may be included within the vulnerability database. The NSAS tool 200 preferably stores interview results, test results and recommendations in a manner enabling the generation of a single interface display screen showing all of this information. In addition, all information such as test plans and procedures, test results, survey questions and answers, identified vulnerabilities, recommendations and the like are maintained (i.e., created, modified, deleted) using this one interface.

Figure 3:
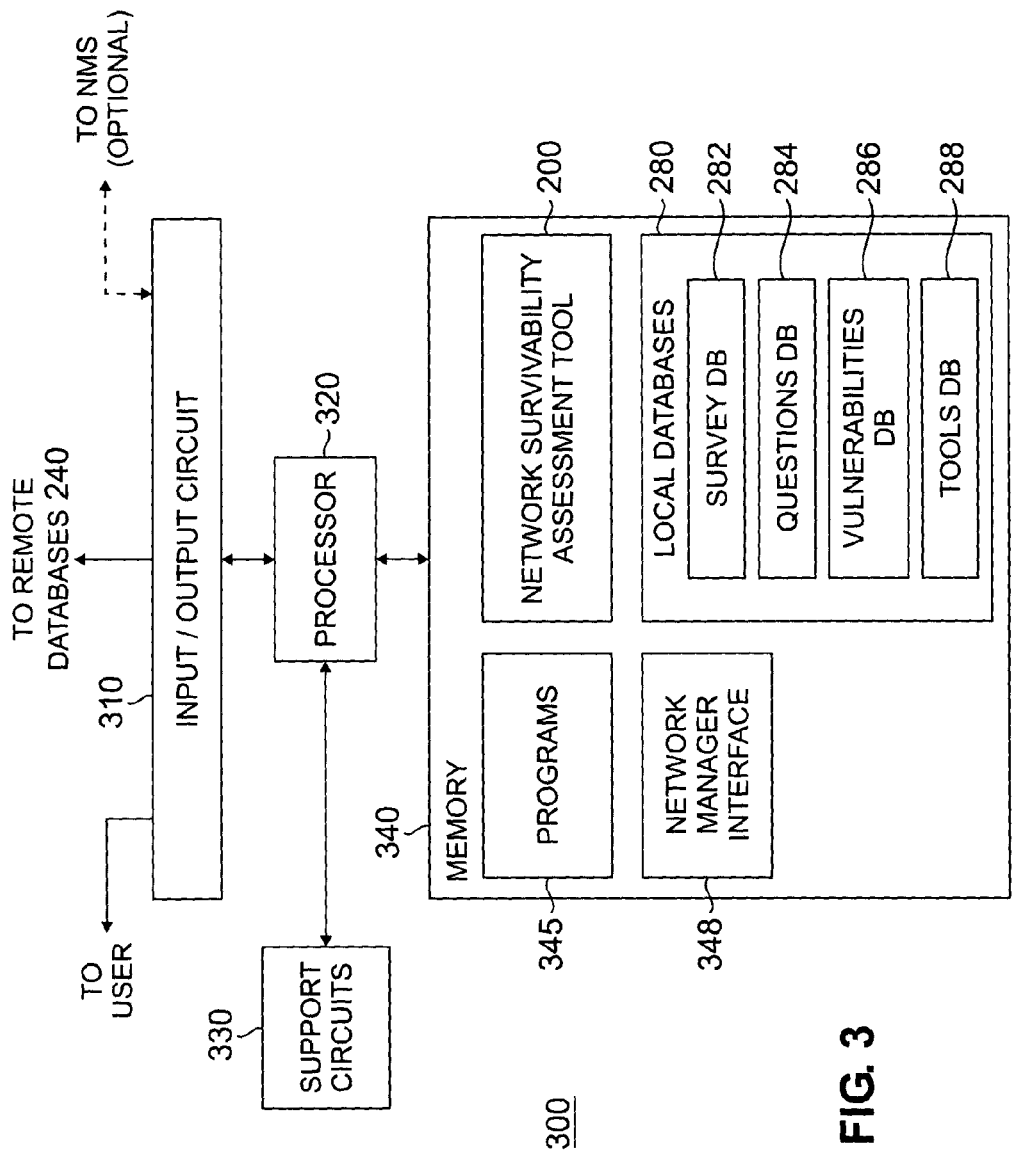
FIG. 3 depicts a high level block diagram of a computing device useful in implementing the present invention.

FIG. 3 depicts a high level block diagram of a computing device or controller useful in implementing the present invention. The controller 300 of FIG. 3 comprises a processor 320 as well as memory 340 for storing various programs 345. The processor 320 cooperates with conventional support circuitry 330 such as power supplies, clock circuits, cache memory and the like as well as circuits that assist in executing the software routines stored in the memory 340. As such, it is contemplated that some of the process steps discussed herein as software processes may be implemented within hardware, for example as circuitry that cooperates with the processor 320 to perform various steps. The controller 300 also contains input/output (I/O) circuitry 310 that forms an interface between the various functional elements communicating with the controller 300.

The memory 340 is used to store a network survivability assessment tool 200, various control functions and/or programs 345, any NSAS databases 280 and, optionally, a network manager interface 348. A network security model such as described above with respect to FIG. 1 may also be stored in memory 340. The network survivability assessment service (NSAS) tool comprises software instructions, databases (or instructions to access such databases) and the like associated with the network survivability assessment service tool 200 discussed above with respect to FIG. 2 and, further, discussed below with respect to FIGS. 4-7. The NSAS databases 280 comprise, illustratively, a survey database 282 used to store the qualification questions forming the customer qualification form 220, a questions database 284 used to store the questions from which customized questionnaire 230 is formed, a vulnerability database 286 used to store information pertaining to vulnerability assessment and/or security recommendations and a tools database 288 for storing testing tools and/or plans (or links to such tools and/or plans) suitable for use by the test modules 216. The vulnerability database 286 may comprise a private database synchronized, for example, to the ICAT security Metabase of the National Institute of Standards and Technology (NIST). It should be noted that the NSAS databases 280 may also be stored remotely and accessed via a network in a client-server environment. The network management interface 348 comprises software instructions and the like associated with a network management system (not shown).

Although the controller 300 of FIG. 3 is depicted as a general-purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or a combination thereof.

The controller 300 of FIG. 3 may comprise a core processing component of a computing device or work station further including a display device (not shown), various input means such as a keypad, pointing device and the like (not shown), mass storage devices and network interfaces. In this embodiment, the controller 300 forming such a computing device or work station may be used to design and/or assess a proposed network, an existing network, a proposed modification to an existing network and the like. In one embodiment, the controller 300 of FIG. 3 is further used within the context of a network management system (NMS) to control and/or manage an existing network. In this embodiment, the security and survivability deficiencies within the existing network may be rapidly assessed and resolved.

The network survivability assessment service tool (NSAS) 200 stored in memory 340 and discussed with respect to the various figures herein may be implemented as a single software module or a plurality of interlinked software modules. For simplification, the tool is described as a plurality of modules having related functionality and following a specific form of input and output. However, it will be appreciated by those skilled in the art and informed by the teachings of the present invention that the NSAS tool 200 described herewith, as well as the various supporting functions described herein, may be implemented using any one of a variety of programming techniques. As such, the specific program architecture primarily discussed herein should not in any way be deemed the only appropriate architecture.

Figure 4A:
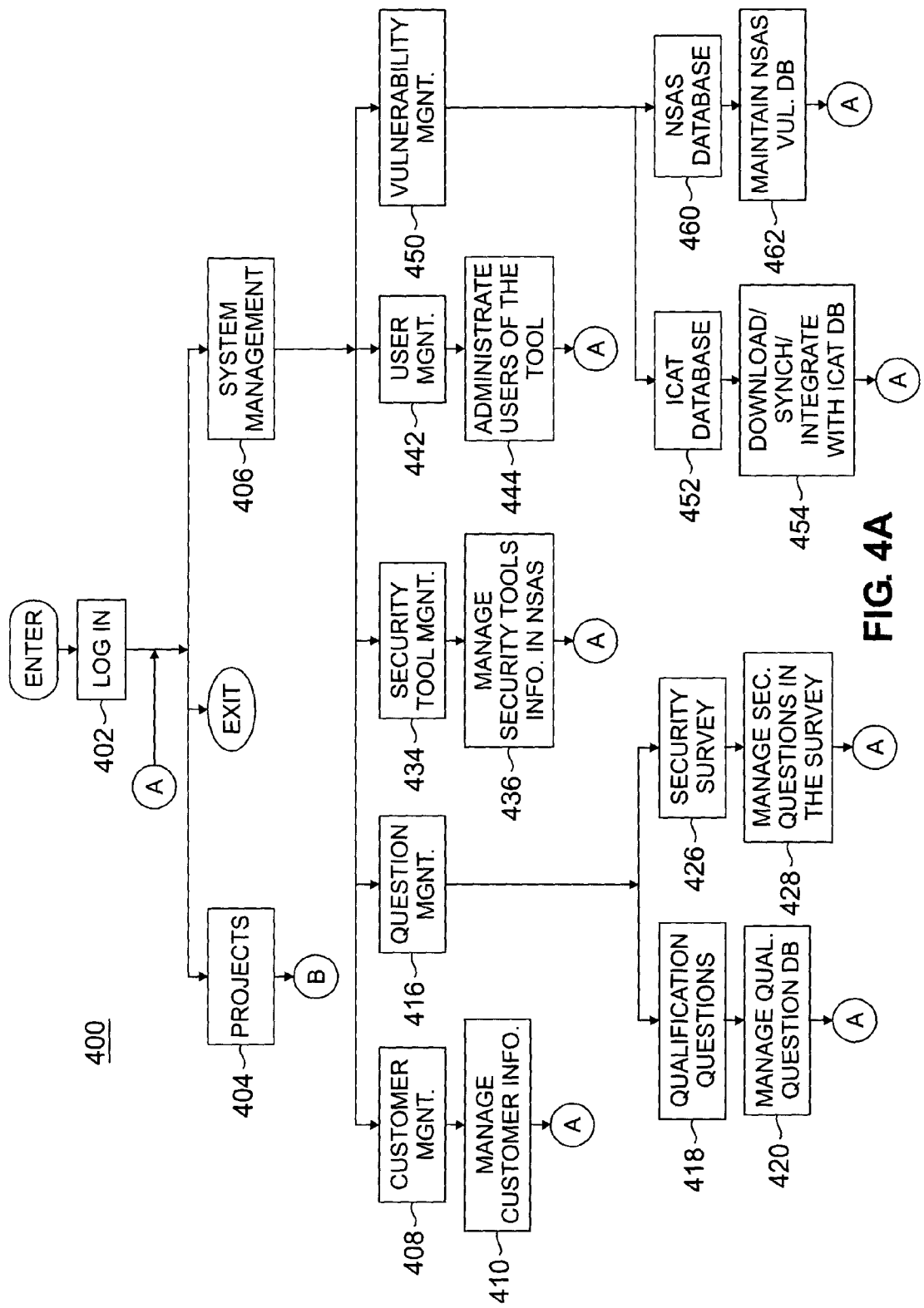
FIG. 4 depicts a flow diagram of a method for implementing an embodiment of the NSAS tool of FIG. 2.
Figure 4B:
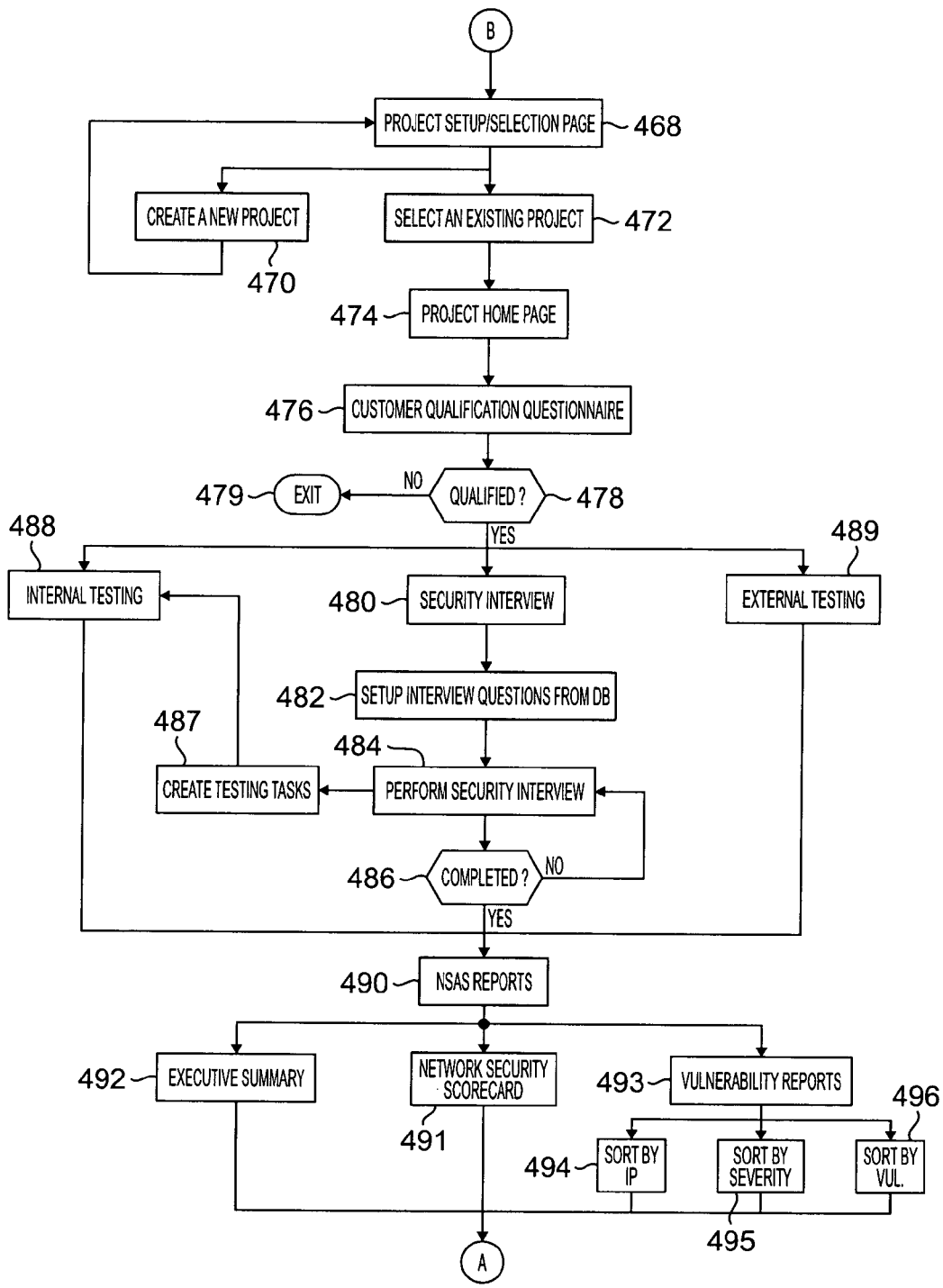

FIG. 4 depicts a flow diagram of a method for implementing an embodiment of the NSAS tool 200 of FIG. 2. Specifically, the method 400 of FIG. 4 is entered at step 402 at a login procedure in which a user (or customer) is presented with a login home page from which the user identifies whether a project function or system management function is to be performed. If a project management function 404 is to be performed, the method 400 proceeds to step 468 (FIG. 4B).

If a system management function 406 is to be performed, then a determination is made as to whether a customer management function 408, question management function 416, security tool management function 434, user management function 442 or vulnerability management function 450 is to be performed.

In the case of a customer management function 408, the customer information is managed at step 410 and the user has the option of performing any additional functions that he/she is authorized for (including logging out) by means of the navigation bar that is always present on the screen. The customer information to be managed may comprise, for example, customer contact information such as customer name, address, phone number and the like.

In the case of a question management function 416, the qualification questions within the qualification question database 284 may be managed (418, 420) and/or the security survey questions (426, 428) within the survey question database 282 may be managed. The qualification question database 284 includes those questions to be answered by a customer via the customer qualification form 220. The survey question database comprises those questions from which the questionnaire module 214 generates the customized questionnaire 230. Management functions include, for example, adding questions, deleting questions and modifying questions. Upon completion of the question management function, the user has the option of performing any additional functions that he/she is authorized for (including logging out) by means of the navigation bar that is always present on the screen.

In the case of a security tool management 434, the security tool information within the NSAS tool is interactively managed by the user and the user has the option of performing any additional functions that he/she is authorized for (including logging out) by means of the navigation bar that is always present on the screen. Security tool information is stored within the tools database 288. Security tool information that may be managed comprises, illustratively, the identification or resource location information associated with test tools or test plans which may be invoked by the internal test module 216IN and/or external test module 216EX. These test tools and test plans may be proprietary or public test tools and test plans such as provided by government entities or standards bodies seeking to ensure compliance with promulgated security standards and/or procedures.

In the case of a user management function 442, the users of the tool are administered to at step 444 and the user has the option of performing any additional functions that he/she is authorized for (including logging out) by means of the navigation bar that is always present on the screen. The user information to be managed may comprise, for example, user name, password, resource access rights and the like.

In the case of a vulnerability management function 450, the method provides one or both of proprietary and publicly available vulnerability management functions. Specifically, the National Institute of Standards & Technology, an institution of the U.S. government, maintains a structured vulnerability database which, among other attributes, assigns identifiers to specific vulnerabilities according to a common vulnerabilities and exposure (CVE) dictionary. The CVE dictionary provides definitions that assist in characterizing vulnerabilities which are arranged in a searchable index of computer vulnerabilities known as the ICAT Metabase. The ICAT security Metabase is a database of vulnerabilities and patches maintained by the NIST which may be used to synchronize local vulnerability databases using the NSAS tool. Similarly, the Computer Emergency Response Team (CERT) at Carnegie Mellon University maintains another publicly accessible database of security vulnerabilities and recommendations that may used to synchronize local vulnerability databases using the NSAS tool. It will be appreciated by those skilled in the art and informed by the teachings of the present invention that any other vulnerabilities database may be used to synchronize local vulnerability databases using the NSAS tool. For exemplary purposes only, we use the ICAT Metabase for the remainder of this document.

The ICAT Metabase provides a centralized means of accessing solutions to identified computer vulnerabilities (e.g., resource addresses such as hypertext or extensible markup language (HTML, XML) links of "patch" programs). Within the context of ICAT, vulnerabilities may be ranked in terms of severity (i.e., high, medium and low), exploitable range (i.e., local or remote) loss type (i.e., availability, confidentiality, integrity and the like) and other parameters. The vulnerability nomenclature used within the context of the ICAT Metabase may be used within the context of the present invention. Optionally, where additional and/or proprietary vulnerability definitions are desired, the NSAS tool establishes and maintains a NSAS vulnerability database which may include a super set or subset of the ICAT database. Preferably, but not necessarily, the proprietary NSAS database conforms to the ICAT database nomenclature including the CVE lists.

At step 452, the ICAT Metabase is accessed and, at step 454, a corresponding download function, synchronization function and/or integration function (i.e., combine at least in part with NSAS vulnerability database) associated with the ICAT database is performed. At step 460, an NSAS proprietary database is accessed and, at step 462, the NSAS database is updated or otherwise maintained. At the conclusion of one or both of these operations, the user has the option of performing any additional functions that he/she is authorized for (including logging out) by means of the navigation bar that is always present on the screen.

Referring to FIG. 4B, if the project function 468 is selected from the login page, then a project setup/selection page is displayed. From this page, a user selects an existing project 472 which results in a corresponding display of a project home page 474 as well as the display of at least a portion of a customer qualification questionnaire 476. A new project is created 470 as necessary after the project setup/selection page interaction 468.

At step 478 a determination is made as to whether the customer is qualified for an NSAS assessment. If not, then the method exits at step 479. Customer qualification questions are managed at steps 418 and 420. In the case of a qualified customer, the user selects one of a security interview 480, internal testing suite 488 and external testing suite 489.

In the case of selection of the security interview 480, at step 482 the security interview questions are retrieved from the survey database 282 and filtered based on the customer qualification form 220 to create the customized questionnaire 230. The security interview is performed at step 484 until determined to be complete at step 486. Upon completion, the internal tests and external tests that have been identified, based on the customer qualification form 220 and the customized questionnaire 230 are scheduled to run in steps 488 and 489. Upon completion of the internal and external tests, at step 490 NSAS reports are generated. Such reports may comprise, for example, a network security score card 491, an executive summary 492 and various vulnerability reports 493. The vulnerability reports 493 may be sorted by, for example, by IP address, 494, severity 495 and/or CVE number 496. Other sorting criteria may be used. Upon generation of the various summaries, score cards and reports, the user has the option of performing any additional functions that he/she is authorized for (including logging out) by means of the navigation bar that is always present on the screen.

During performance 484 of the security interview, a user response to a question may trigger the creation of testing tasks 487, which tasks are communicated to the internal testing module 216IN for execution at step 488. The testing tasks or addresses of the testing tasks are stored within the tools database 288. Further details are discussed below with respect to FIG. 5.

Figure 5A:
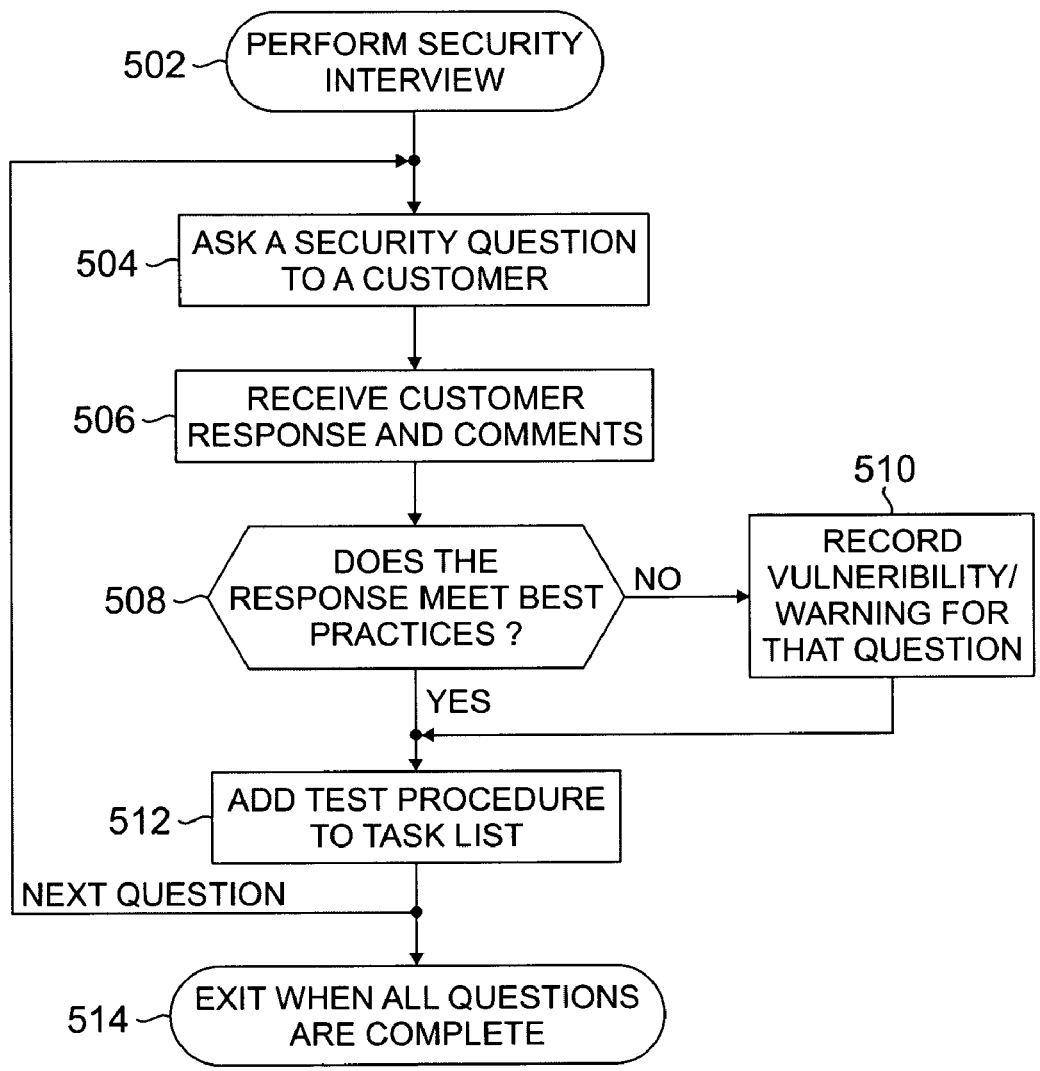
FIGS. 5A and 5B depict flow diagrams of, respectively, a security interview method and a testing method suitable for use in the NSAS method of FIG. 4.

FIG. 5A depicts a flow diagram of a security interview method suitable for use in the NSAS method of FIG. 4. Specifically, the method 500A of FIG. 5A is suitable for use as steps 484-486 within the method 400 of FIG. 4.

The method 500A of FIG. 5 is entered at step 502 upon determination that a security interview is to be performed. At step 504, a display screen prompts a customer or user with a security question. At step 506, the customer or user response (and any comments) are received.

At step 508, a determination is made as to whether the user response(s) received at step 506 conforms to a "best practice" or other threshold level indicative of appropriate individual responses and/or appropriate aggregate responses within the context of insuring network security. If the response does not meet best practices, then at step 510 a vulnerability/warning is recorded for that question, and the method proceeds to step 512. If the response does meet best practices, then the method proceeds to step 512.

At step 512, a test procedure(s) associated with the question is added to a task list. The task list comprises a list of tasks to be executed after the interview is concluded.

Steps 504-512 are repeated until all the questions are complete, at which point the method 500 exits as step 514.

Figure 5B:
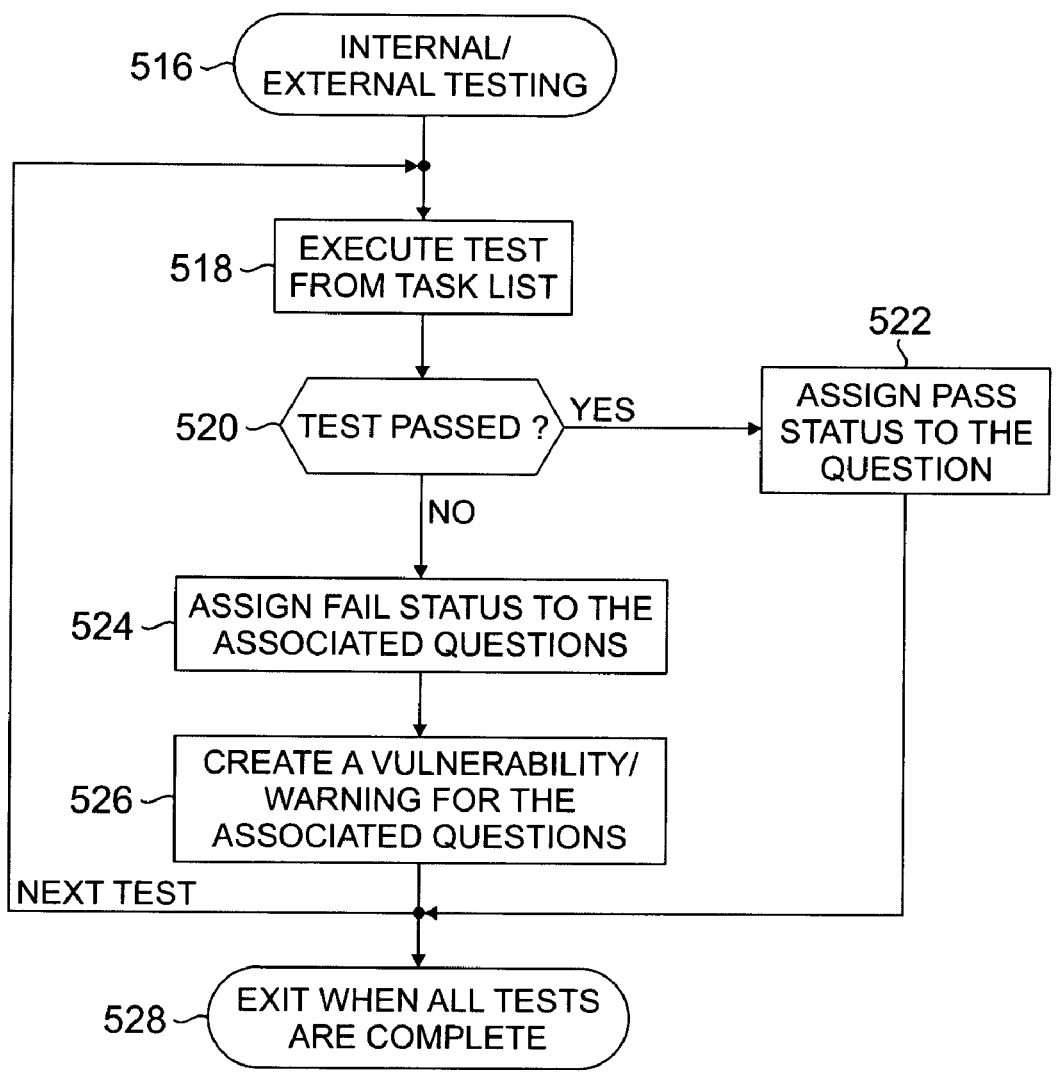

FIG. 5B depicts a flow diagram of a testing method suitable for use in the NSAS method of FIG. 4. Specifically, the method 500B of FIG. 5B is suitable for use as steps 488 and 489 within the method 400 of FIG. 4.

The method 500B of FIG. 5B is entered at step 516 upon determination that internal or external tests need to be performed by, for example, noting the presence of test procedures within the above-described task list. At step 518, a test is removed from the task list and executed. At step 520 the results of the test are evaluated for pass/fail status. If the test is passed, the method proceeds to step 522 where the status of all questions associated with that test are assigned the status of "Pass." The method then proceeds to step 518 where the next test on the task list is executed.

If the test failed, the method proceeds to step 524 where the status of all questions associated with that test are assigned the status of "Fail." The method then proceeds to step 526 where a vulnerability/warning is created for each question associated with that test. The method then proceeds to step 518 where the next test on the task list is executed. When all tests are complete, the method exits at step 528.

The above-described NSAS tool is an automated security assessment tool that can be based on any security model that delivers substantially an entire security assessment from one interface. This security assessment tool forces the systematic execution of security assessments and thereby eliminates the dependency of the quality of the overall security assessment on the individual performing the security assessment, by ensuring that every step of a security assessment is performed and that each step is performed in the same manner every time a security assessment is performed. The security assessment tool is also modular so that the security assessment can be customized to the security environment of individual customers by eliminating individual steps as the customer sees fit.

The advances incorporated into the security assessment tool advantageously include some or all of the following: (1) Automatic selection of questions for a security interview based on the results of a customer qualification form completed during the initial steps of the security assessment. The security interview is conducted with individuals responsible for implementing network security. (2) Automatic presentation of the security interview, capture and storing of the results of the security interview. (3) Automatic selection and configuration of tests to be performed that assess a network's actual security posture. The automatic selection and configuration of tests is based on the results of the aforementioned customer qualification and security interview process. (4) Storage and correlation of customer qualification information, security interview information, test results, and vulnerability information on one platform in order to identify actual security vulnerabilities and eliminate false positives. (5) Automatic generation of reports that list the security vulnerabilities found during the customer qualification and interview process as well as testing process along with recommendations to address these vulnerabilities.

While the invention has been primarily described within the context of assessing an entire network, it must be noted that the invention is equally applicable to portions of a network as well as individual network elements, applications and services. Thus, using the present invention, individual network elements, applications and services may be designed (or redesigned) to include appropriate security requirement levels prior to general release, thereby avoiding costly software and/or hardware upgrades to correct security problems.

FIG. 8 depicts an representation of a network security model according to one embodiment of the invention. Specifically, the network security model is presented in a tabular form to provide a methodical approach to securing networks. As can be seen from FIG. 8, each of a Mangement Plane 810, Control Plane 120 and User Plane 830 intersects with each of an Infrastructure Layer 840, a Service Layer 850 and an Application Layer 860. For each intersecting Plane and Layer a unique security perspective is provided, which perspective is addressed by a respective module within the software forming the model or tool using the model to analyze network, network element, application and the like. There are, illustratively, nine module representing the nine intersections of the Layers and Planes. Each module is automatically executed in response to user input indicative of an analysis of the specific Layer/Plane (or via the tool methodology previously discussed). Each module is associated with at least one of the eight security mechanisms previously discussed.

Exemplary Application of End-to-End Network Security Model

The following discussion will focus on an exemplary application of the network security model to address security concerns within the context of network equipment and services provided, illustratively, by Lucent Technologies, Inc. of Murray Hill, N.J. In this discussion, the term Lucent sponsored offers (LSOs) will refer to various technologies and architectures manufactured or otherwise offered by Lucent Technologies, Inc. It will be appreciated by those skilled by the art and informed by the teachings of the present invention that the term LSO may also be used to represent to products and/or services offered by other companies. Broadly speaking, the following discussion provides an example of how the network security model, methods and tool can help to develop a security assessment, written security requirements and an end-to-end security solution for networks.

The security model represents a mechanism for identifying points within the LSOs that deserve security attention. The investigation process also provides an inherent prioritization of actions to address security needs. In this manner, the cross development of security components of products is addressed thereby ensuring a core security characteristic. As the security interoperability of LSOs progresses, addressing the security architecture for future LSOs will require less and less intervention until security is implemented at fundamental levels to ensure that as LSOs are introduced and products are developed the security is assumed and inherent.

FIG. 6 depicts a graphical representation of the security model as applied to a plurality of LSOs. Specifically, the graphical depiction 600 of FIG. 6 depicts an applications security layer 126, services security layer 124 and infrastructure security layer 122 intersecting each of nine Lucent sponsored offers 610-690. Specifically, a CDMA/TDMA 2G/3G offer 610, a GSM UMTS offer 620, an end-to-end IP service offer 630, a metropolitan networking offer 640, a multi service core offer 650, a circuit to packet offer 660, an intelligent optical network offer 670, an end-to-end Ethernet offer 680 and a network hosted services offer 690 are implicated by the various security layers 122-126. As previously noted, each of the security layers comprises a management plane 120MP, a control plane 120CP and an end user plane 120EUP. It will be appreciated by those skilled in the art informed by the teachings of the present invention that more or fewer offers may be analyzed and that offers from multiple companies or service providers may be analyzed at the same time.

Figure 7:
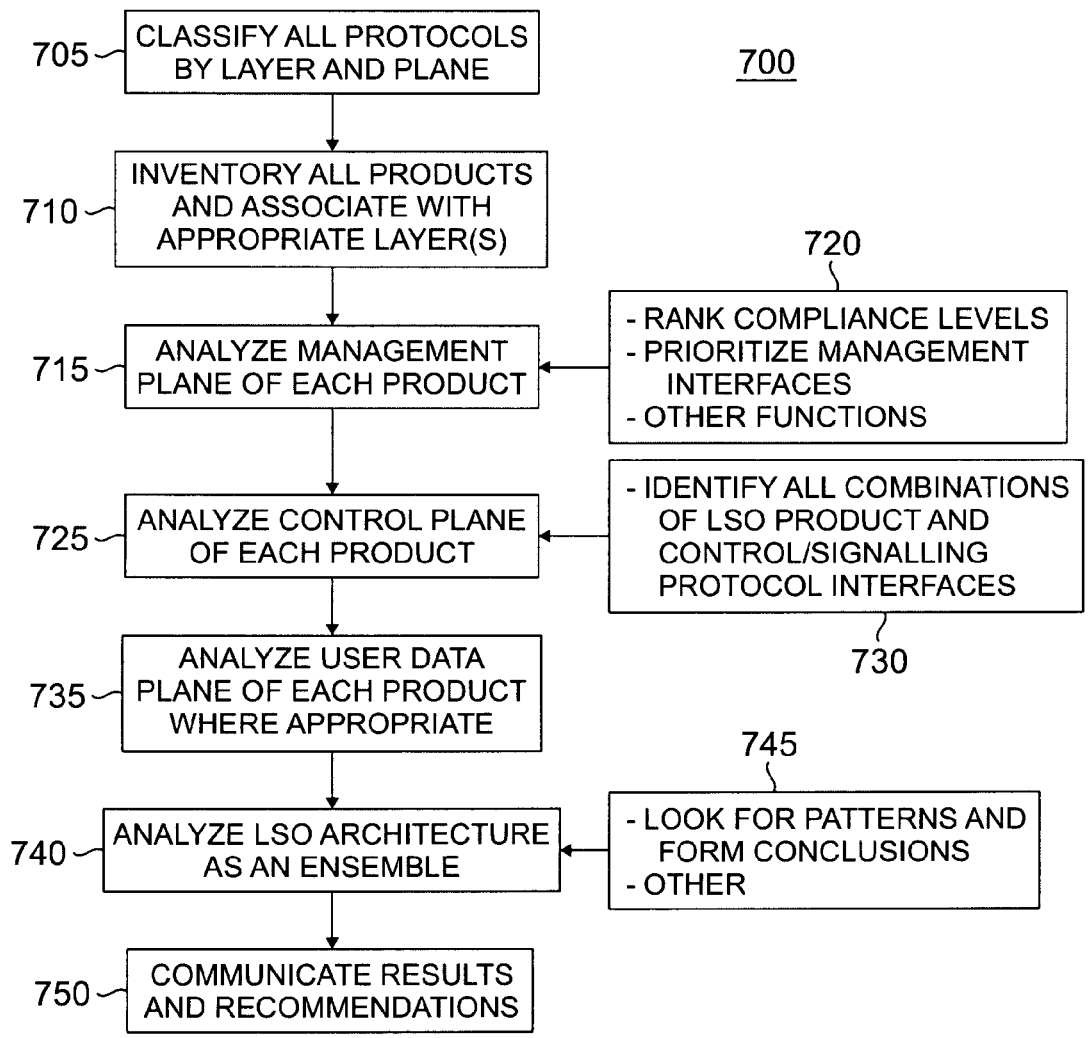
FIG. 7 depicts a flow diagram of a method according to an embodiment of the present invention.

FIG. 7 depicts a flow diagram of a method according to an embodiment of the present invention. The method describes a security investigative process through which the gaps between the ideal security model and the current reality can be identified. The method 700 of FIG. 7 is directed toward developing a security assessment of a plurality of architectures within a mixed architecture network environment such that security requirements and end-to-end security solutions may be implemented. The method utilizes the above-described security model and systematically maps it onto each of, illustratively, nine Lucent Sponsored Offer (LSO) architectures.

The method 700 of FIG. 7 addresses, illustratively, the architectures discussed above with respect to FIG. 6. It will be appreciated by those skilled in the art that more or fewer architectures than the nine architectures depicted may be processed according to the method of FIG. 7. Moreover, architectures from multiple companies and/or service providers may be included within the security analysis and recommendations discussed herein.

The method 700 of FIG. 7 is entered at step 705 when each of the LSO protocols are classified according to layer and plane. That is, the LSO security investigation process begins by assembling a complete architectural view of its functional components independent of any product specific mappings. A direct side effect of that review is an exhaustive list of all protocols that communicate between the various functional components. Given that list, the investigation classifies each protocol into at least one element such as depicted below in Table 2 in an LSO independent template form. The investigator replicates the Table 2 template for each LSO being investigated, determines the revenue-generating services that occupy the LSO's Service Layer, and the bundled applications within the LSO's Application Layer. Finally, the inves-

TABLE 2

| LSO Protocols | Application Layer | Service Layer | Infrastructure Layer |
|---|---|---|---|
| Management Plane | Identify the protocols that manage the applications bundled with this LSO and whom depend on the LSO's service layer | Identify those protocols that manage the LSO specific services that generate Service Provider revenue | Identify the protocols that manage the network elements and Element Managers inhabiting this LSO, independent of any LSO specific services |
| Control Plane | Identify the LSO's application specific control/signaling protocols. Determine if they depend on any security mechanisms supplied by the Service Layer or Infrastructure Layer | Identify the LSO's control/signaling protocols for each of the LSO specific revenue generating services. Determine any dependencies on security mechanisms supplied by the Infrastructure Layer | Identify the control/signaling protocols for the network elements. |
| User Data Plane | Identify the LSO's application specific user data protocols. Determine if they depend on any security mechanisms supplied by the Service Layer or Infrastructure Layer | Identify the LSO's user data protocols for each of the LSO specific revenue generating services. Determine any dependencies on security mechanisms supplied by the Infrastructure Layer | Identify the user data protocols for the network elements. Determine any dependencies on security mechanisms supplied by other protocols in the Infrastructure Layer |

At step 710, an inventory of all LSO products and/or services is performed such that each LSO product and/or service may be associated with an appropriate layer or layers. That is, at step 710 the investigation module constructs a table of data such as shown in Table 3 for every LSO product. Some products may straddle multiple layers (e.g. service layer and infrastructure layer) because they combine multiple functions within their product. A product also may participate in multiple LSO Service Provider revenue generating services.

TABLE 3

| LSO Product Inventory | Application Layer Protocols | Service Layer Protocols | Infrastructure Layer Protocols |
|---|---|---|---|
| PSAX 2300 Product Y | SNMPv1 | Sapphire, IP, Ethernet, | UNI 4.0, |

At step 715, the management plane associated with each product and/or service is analyzed to (per box 720) rank compliance levels, prioritize management interfaces and perform other functions. That is, at step 715 the investigation module constructs a table of data such as shown in Table 4 for every combination of LSO product and management protocol interface. The goal is to rank the compliance level of each product's management plane versus the eight security mechanisms. These compliance rankings would become the text filled into each LSO Table 4 element.

An important objective during this investigation phase is prioritizing which management interfaces need attention sooner than others. There are many gradations of management plane security compliance, and the LSO offer manager must make a business decision to what extent he/she will accept a security risk versus invest to improve a given product discovered to be at the low end of compliance.

TABLE 4

| LSO product and protocol combination | Management Plane Security Mechanisms | | | | | | | |
|---|---|---|---|---|---|---|---|---|
| | Access Management | Authentication | Non-repudiation | Data Security | Communication Security | Integrity | Availability | Privacy |
| PSAX 2300 SNMPv1 | SNMP MIB view, community strings | None | None | None | None | None | None | None |
| Product X protocol B | | | | | | | | |
| Product Y protocol A | | | | | | | | |
| Product Y protocol B | | | | | | | | |

At step 725, the control plane associated with each product and/or service is analyzed to (per box 730) identify all combinations of LSO product and control/signaling protocol interfaces. That is, at step 725 the investigation module constructs a table of data such as shown in Table 5 for every combination of LSO product and control/signaling protocol interface.

TABLE 5

| LSO product and protocol combination | Control Plane Security Mechanisms | | | | | | | |
|---|---|---|---|---|---|---|---|---|
| | Access Management | Authentication | Non-repudiation | Data Security | Communication Security | Integrity | Availability | Privacy |
| Product X protocol A | | | | | | | | |
| Product X protocol B | | | | | | | | |
| Product Y protocol A | | | | | | | | |
| Product Y protocol B | | | | | | | | |

At step 735, the user data plane associated with each product and/or service is analyzed where appropriate. That is, at step 735 the investigation module constructs a table of data such as shown in Table 6 where appropriate. Specifically, there are many cases where investigating the User Data Plane falls outside the scope of the LSO security investigation. Selecting which user data plane protocols merit an investigation effort is a filtering process wherein any one of the following questions should be answered in the affirmative before the user data plane protocol qualifies for investigation: (1) Does the user data transit any layer-2 networks that can not be assured of being physically secure from adversaries (e.g. a wireless technology)?; (2) Does the Application Layer or Service Layer traffic possess properties that prevent the use of end to end IP Security (e.g. real-time video that can not be delayed by encryption latency)?; and (3) Does the Application Layer or Service Layer transport or store user data whose disclosure to an adversary would violate relevant legal statutes, adverse publicity, or incur contractual damages (e.g. location privacy)?
After the filtering, the investigator fills in the Table 6 for every remaining combination of LSO product and user data protocol interface.

That is, prior to this step, every LSO component had been examined largely in isolation from any other. In this step, the investigator reviews the architectural findings on a holistic basis. The security investigation process will have assembled enough information that one can perceive patterns and form overall conclusions about the LSO's security. Patterns that might appear include but are not limited to the following: (1) Multiple products that share a common weak protocol or architectural design assumption; (2) Neglect of a particular security mechanism that could be applied more pervasively (e.g. Denial of Service resistance); (3) Protocol interactions that assume too much trust amongst a group of peer components, rather than decomposing their security trust domain into smaller compartments. The design goal is that the compromise of one compartment does not expose too many key components to an adversary; (4) The LSO architecture had overlooked a security issue because they only took the perspective of the Service Provider and did not consider the service consumer's perspective. For example, realizing that a mobile consumer has a need to control third party accesses and have an investigation trail logging those accesses for their location and other private information; and (5) Interactions between Lucent Technologies LSO products and those of competitors.

The investigator fills in a template such as shown below as Table 7 with an entry for each security gap discovered by the steps 3 through 6. Gaps are optionally sorted by priority, where the priority assignment may be influenced by a variety of factors such as: (1) The probability that an adversary could detect and exploit a security weakness; (2) The amount of potential damage that an adversary might incur if they penetrated the LSO security perimeter through the security gap;

TABLE 6

| LSO product and protocol combination | User Plane Security Mechanisms | | | | | | | |
|---|---|---|---|---|---|---|---|---|
| | Access Management | Authentication | Non-repudiation | Data Security | Communication Security | Integrity | Availability | Privacy |
| Product X protocol A | | | | | | | | |
| Product X protocol B | | | | | | | | |
| Product Y protocol A | | | | | | | | |
| Product Y protocol B | | | | | | | | |

At step 740, the entire LSO architecture is analyzed as a group of products and/or services to (per box 745) look for patterns and form conclusions pertaining to the security of the products and/or services as a group rather than individually.

(3) The cost in time and money to remedy the security gap; and (4) The potential adverse publicity that might ensue if a security gap became the basis for a major breach that got reported to the media.

TABLE 7

| LSO Product and Protocol | Security Gap Description | Priority | Recommendation |
| --- | --- | --- | --- |
| SNMPv1 | Lack of data authentication, privacy and integrity. | High | For system use make sure other protection mechanisms exist such as IPSec, for individual element upgrade to SNMPv3 |

At step 750, results and recommendations determined by the various analysis steps discussed above are communicated to the user.

The above-described embodiments disclose a novel security model, which includes, illustratively, three security layers, three planes, and eight security mechanisms. Also disclosed is the segmentation of end-to-end network security into three security layers: (1) Infrastructure Security Layer, (2) Services Security Layer, and (3) Applications Security Layer. The Infrastructure Security Layer specifies how to secure individual network elements and transmission facilities. The Services Security Layer specifies how to secure network services (e.g., VPNs, QoS, etc.) from an end-to-end perspective. The Applications Security Layer specifies how to secure network-based applications (e.g., E-Commerce, Video Conferencing, etc.) from an end-to-end perspective. An Interactive Security Analysis Tool based on the end-to-end network security model is also disclosed. In addition, Security Analysis Tables may be used to analyze end-to-end network security, which tables correlate Security Threats, Security Mechanisms, Security Planes, and Security Layers. A security rating may be produced by the security analysis process to assign compliance percentage to the network application, service, or product being analyzed. The security rating is an output of the security analysis process and represents a percentage of a total compliance with network security best practices for a network application, service, or product being analyzed.

Although various embodiments that incorporate the teachings of the present invention have been shown and described in detail herein, those skilled in the art can readily devise many other varied embodiments that still incorporate these teachings.

What is claimed is:

1. An apparatus comprising a processor and a memory, wherein the memory stores a software tool for assessing network security of at least a portion of a network, the software tool comprising:
    a first module, for receiving, from a customer, information adapted for assessing network security, at least a portion of said information comprising customer responses to questions;
    a second module, for executing network testing procedures on the network to generate therefrom test results adapted for assessing network security, wherein at least a portion of said network testing procedures are automatically selected for execution on the network based on at least a portion of said customer responses to said questions;
    a third module, for determining, using said information and said test results, if said network has associated with it a network security vulnerability; and
    a fourth module, for generating security recommendations based upon any determined network security vulnerabilities.

2. The apparatus of claim 1, said software tool further comprising:
    a fifth module, for generating a customer qualification form using qualification questions stored within a first database, said customer responses to said questions including customer responses to said qualification questions.

3. The apparatus of claim 2, wherein:
    said fifth module, in response to said customer responses to said qualification questions, generating a customized questionnaire using at least some of a plurality of survey questions stored within a second database;
    said customer responses to said questions including customer responses to said survey questions.

4. The apparatus of claim 1, wherein:
    said second module executing said selected network testing procedures in response to customer question responses indicative of a vulnerability.

5. The apparatus of claim 1, wherein:
    said third module analyzing a network and its elements to determine additional vulnerabilities, mapping a network architecture, and providing an inventory of network elements;
    said fourth module generating additional security recommendations based upon any additional vulnerabilities.

6. The apparatus of claim 1, wherein:
    said fourth module compares said information adapted for assessing network security to information within a vulnerability database to identify network security vulnerabilities.

7. The apparatus of claim 6, wherein:
    said vulnerability database specifies network security vulnerabilities according to a common vulnerabilities and exposure (CVE) dictionary.

8. The apparatus of claim 6, wherein:
    said vulnerability database comprises at least one of a publicly available vulnerability database and a local database.

9. The apparatus of claim 8, wherein:
    said publicly available vulnerability database comprises at least one of the ICAT Metabase and the Computer Emergency Response Team (CERT) database.

10. The apparatus of claim 7, wherein:
    said vulnerability database associates each specified network security vulnerability with at least one corresponding security recommendation;
    said fifth module retrieving from said vulnerability database said security recommendations corresponding to identified network security vulnerabilities.

11. The apparatus of claim 1, wherein:
    said fourth module generates a security rating.

12. The apparatus of claim 1, wherein:
    said fourth module generates a security analysis table for correlating security threats, security mechanisms, security planes, and security layers.

13. The apparatus of claim 1, wherein:
    a network security model is used to adapt the operation of at least the third and fourth modules.

14. The apparatus of claim 13, wherein:
said network security model classifies the functions of each of a plurality of network elements, protocols and services according to respective ones of a plurality of security layers, each of said security layers responsive to at least one of a plurality of security mechanisms adapted to mitigate network security threats;
said network model associates each classified function with at least one of a plurality of security planes, each of said plurality of security planes included within each of said plurality of security layers;
said network model enables identifying of the vulnerability of each function for each security layer and security plane associated with said function.

15. The apparatus of claim 1, wherein:
said fourth module generates a report listing said network security vulnerabilities.

16. The apparatus of claim 15, wherein:
said report includes security recommendations derived from a vulnerability database that specifies network security vulnerabilities according to a common vulnerabilities and exposure (CVE) dictionary.

17. The apparatus of claim 4, wherein:
said selected network testing procedures are configured in response to at least one of said customer responses to said qualification questions and said customer responses to said survey questions.

18. The apparatus of claim 1, wherein:
said fourth module generates a security assessment indicative of a percentage compliance with group of best practices.

19. The apparatus of claim 1, wherein:
said customer interacts with said tool and receives said security recommendations via a common interface.

20. The apparatus of claim 14, wherein:
said plurality of security planes comprises an end user security plane, a control security plane, and a management security plane;
said plurality of security layers comprises an infrastructure security layer, a services security layer, and an applications security layer; and
said plurality of security mechanisms comprises an access management mechanism, an authentication mechanism, a non-repudiation mechanism, a data confidentiality mechanism, a communication security mechanism, an integrity mechanism, an availability mechanism, and a privacy mechanism.

21. A computer readable storage medium storing instructions which, when executed by a processor, perform a method for assessing network security, the method comprising:
receiving, from a customer, information adapted for assessing network security, at least a portion of said information comprising customer responses to questions;
executing network testing procedures on the network to generate therefrom test results adapted for assessing network security, wherein at least a portion of said network testing procedures are automatically selected for execution on the network based on at least a portion of said customer responses to said questions;
determining, using said information and said test results, if a network has associated with it a network security vulnerability; and
generating security recommendations based upon any determined network security vulnerabilities.

* * * * *